(12) United States Patent
De Stoutz

(10) Patent No.: US 6,496,649 B2
(45) Date of Patent: Dec. 17, 2002

(54) PROCESS FOR STERILIZATION USING A TUBULAR EXCHANGER

(76) Inventor: Jean-Christian De Stoutz, Château de Larringes, 74500 Evian les Bains (FR)

( * ) Notice: Subject to any disclaimer, the term of this patent is extended or adjusted under 35 U.S.C. 154(b) by 0 days.

(21) Appl. No.: 09/829,070

(22) Filed: Apr. 10, 2001

(65) Prior Publication Data

US 2002/0164159 A1 Nov. 7, 2002

(30) Foreign Application Priority Data

Jun. 2, 2000 (CA) .............................................. 2311161

(51) Int. Cl.[7] .................................................. F24H 1/10
(52) U.S. Cl. ............................ 392/478; 422/1; 426/522; 210/175
(58) Field of Search ................................. 392/478, 465, 392/466, 469; 422/1; 426/520, 521, 522; 210/600, 175, 183

(56) References Cited

U.S. PATENT DOCUMENTS

| | | | | |
|---|---|---|---|---|
| 3,293,407 A | * | 12/1966 | Ando | ........................... 138/33 |
| 3,512,998 A | * | 5/1970 | Clark | ........................... 426/522 |
| 3,567,470 A | * | 3/1971 | McElroy | ...................... 426/522 |
| 4,321,884 A | * | 3/1982 | Barkley | ........................ 118/419 |
| 4,534,986 A | * | 8/1985 | Hasting | .......................... 165/66 |
| 4,592,841 A | * | 6/1986 | Ancelle et al. | .............. 210/169 |
| 5,837,303 A | | 11/1998 | Hayden | |
| 6,250,379 B1 | * | 6/2001 | Geissler et al. | .............. 165/145 |

FOREIGN PATENT DOCUMENTS

EP 0476311 3/1992

* cited by examiner

Primary Examiner—Teresa Walberg
Assistant Examiner—Thor Campbell
(74) Attorney, Agent, or Firm—Young & Thompson

(57) ABSTRACT

Process for the sterilization of a liquid or pasty product, according to which the product to be treated is circulated in a tubular exchanger at a speed greater than 5 m/s and in which the temperature rise of the product to be treated is obtained by the circulation of an electrical current through the wall of the tube or tubes of the tubular exchanger.

13 Claims, 3 Drawing Sheets

PROCESS FOR STERILIZATION USING A TUBULAR EXCHANGER

BACKGROUND OF THE INVENTION

The present invention has for its object a process for continuous sterilization of liquid or pasty products. The choice of the use of a tubular exchanger for practicing the process results from the fact that one of the objects of the invention is to provide a process for sterilization by indirect heating which is much more respectful of the product to be treated than the process for sterilization by direct heating used at present or of superheated steam being injected to the product to be treated to raise its temperature. Carrying out direct steam injection is difficult to perform under good conditions, particularly when the temperature must reach values higher than 150° C. to eliminate highly resistant spores and above all gives rise to a modification of the composition of the product by adding water to it, which must then be eliminated from the treated product.

SUMMARY OF THE INVENTION

The first object of the invention is thus to provide a process for the sterilization by indirect heating which can eliminate highly resistant spores, which is to say to raise the temperature of the product to be treated to at least 150° C.

A second object of the invention is to provide a process for sterilization which respects the qualities of the treated product, which is particularly important when the product to be treated is a liquid foodstuff, milk, fruit juice, etc . . . or a liquid used in cosmetics for the production of pharmaceutical products. It is particularly important that the sterilization, whilst eliminating bacteria and highly resistant spores does not modify the taste, the colors, the composition or other characteristics of the products to be treated. It is at least an object of the present invention to provide a process for sterilization which better respects the products to be treated than the existing processes by direct heating.

Still another object of the present invention is to provide a process for sterilization which causes little or no fouling of the tubes for passage of the product to be treated, so as to be able to operate a sterilization installation for at least 16 hours without shutting down and hence without clinging, so as to obtain higher profitability than the existing products for sterilization which permit continuous operation only for several hours, at the most seven to eight hours.

The present invention has for its object a process for continuous sterilization that overcomes the drawbacks of the known processes and permits indirect heating of the product to be treated, a greater respect for the qualities and characteristics of the product to be treated and which can be used without shutdown for a duration of more than 16 hours. This continuous sterilization process is distinguished by the characteristics set forth in claim 1.

BRIEF DESCRIPTION OF THE DRAWINGS

The accompanying drawing shows schematically and by way of example an installation for practicing the process according to the invention, a diagram defining the conditions of operation and of high temperature exchange, and summaries showing various parameters measured during the duration of operation of the pilot installation for practicing the sterilization process.

DETAILED DESCRIPTION OF THE INVENTION

Figure 1:
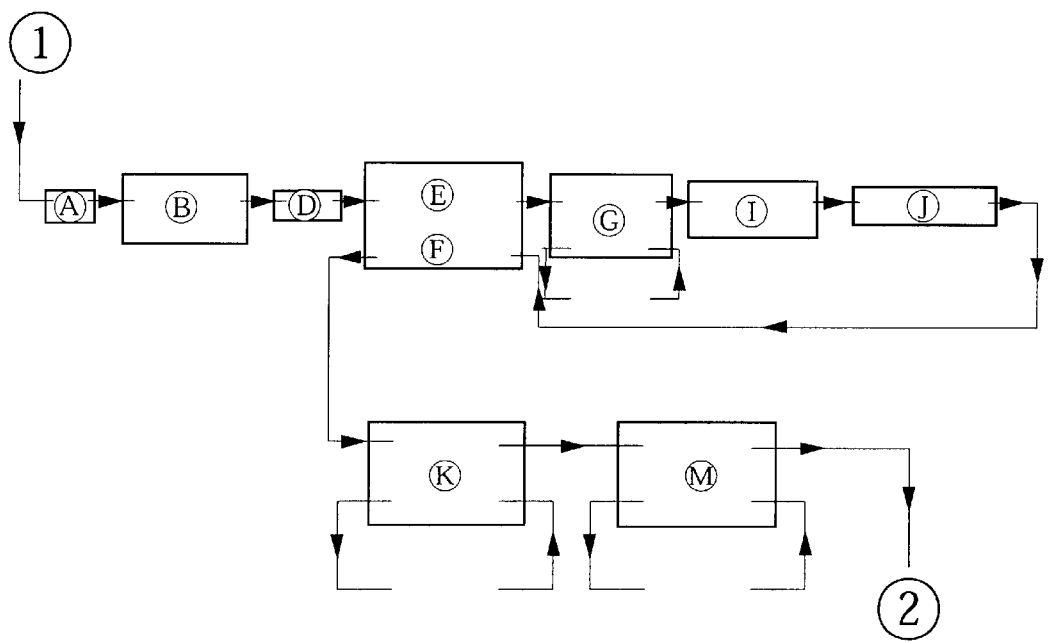
FIG. 1 is a diagram of the pilot installation used to test the sterilization process according to the invention.

Although the process for sterilization according to the present invention is applicable to numerous liquids or fluid pastes to be treated, liquid foodstuffs, cosmetics, pharmaceuticals to mention only several, in the example which follows reference will be had to milk as the treated product.

At present, milk sterilized at UHT (Ultra High Temperature) is subjected to thermal treatments at temperatures conventionally of the order of 135–140° C. It nevertheless appears that these temperature levels are not always sufficient, as highly thermoresistant spores are present in the product to be treated. These spores, called HRS (Highly Resistant Spores), require sterilization regimes much more severe to be destroyed. The kinetics of microbial destruction being connected to the time-temperature couple, two solutions can be envisaged: increasing the treatment time (dwell time at high temperature) or increasing the temperature level. The second solution is preferred, because the sterilization efficiency E of a process can be written $$E = \frac{1}{D(\theta_0)} \cdot 10^{\frac{\theta-\theta_0}{Z}}, \quad t = \log_{10}\left(\frac{N_0}{N}\right) \tag{1}$$

$D(\theta_0)$ decimal reduction time at temperature $\theta_0$ (seconds)

$\theta_0$: reference temperature (° C.)

$\theta$: treatment temperature (° C.)

t: time during which the product remains at temperature $\theta$ (seconds)

Z: temperature factor: for every Z degree, the parameter D is divided by 10 (° C.)

$N_0$: number of thermoresistant spores initially present in the product

N: number of spores surviving after treatment

The relationship (1) shows clearly that the temperature is much more "active" (power law) on the value of E than the time t (proportionality relation). Moreover, if one were content to alter only the dwell time, the associated problems of operation would be encountered; size of installation, problems of heat loss, volume of installation, etc . . .

The wisest solution is to raise the temperature level but the question arises as to the manner of heating to be used to reach temperatures of 150° C. or more. Thus, the most suitable technology must accord with two principal objectives:

√ The process aspect: facility of practice, precision as to measurements carried out, reliability of the process, . . .

√ The product aspect: the process must not alter the intrinsic properties of the product (milk in this case) and must yield a product similar or "better" than that obtained at present with treatments of the UHT type. Here are several of the "qualities" which the product must have: sterility (complete absence of any microorganism, pathological or not), color, taste, limited presence of undesirable components (lactulose for example), etc . . .

Two general heating modes could possibly fulfill these objectives: direct heating (direct contact between the product and the heating element which is steam) and indirect heating (presence of a wall separating the product from any other fluid). Until now, the first mode was used: see as to this the RLF publication (January–February 1999) setting forth and promoting the merits of heating by direct injection with steam or by infusion. The process according to the invention proposes a very high temperature treatment (>150° C.) of milk without using steam, given that this will avoid problems such as: elimination of water in the treated product, the requirement for a sizable heater, the adjustment of steam injection, the design of the injectors . . .

The product considered in the first instance is milk (pasteurized, 2%) it being evident of course that the results could if desired be used for any other product requiring "very high" temperatures.

The increase of temperature to about 135° can be carried out by conventional processes, but the increase from 135° C. to a temperature greater than 150° C. should be carried out without using steam. According to the invention, it is proposed to use a tubular heat exchanger, particularly a Joule effect tubular exchanger of the type described in the patent EPO 476 311.

All of the exchangers used are tubular exchangers (for preheating, cooling, sterilization segments . . . ).

The duration of sterilization $F_0$ to which the product is subjected in any installation should be at least 80 minutes, given that this temperature scale is computed (constant temperature $\theta$, dwell time t) by:

$$Fo = 10^{\frac{\theta-\theta_0}{Z}}, \quad t = E \cdot D(\theta_0) \qquad (2)$$

When milk is heated at sufficiently high temperatures (greater than 120° C.), the lactose present in the initial material has the tendency to produce lactulose, which itself is not present in the raw milk. The final concentration in lactulose is to be minimized in the treated product, because at high concentration, the presence of lactulose could have undesirable effects on the health of the consumer.

For conventional UHT milks, the mean content of lactulose is of the order of 700 mg/l. The invention proposes to carry out a process permitting obtaining a better product, namely having a lactulose content less than UHT milk, for example of the order of 400 mg/l.

It will be noted that, for initial computations, we have used as the kinetic for the appearance of lactulose that which was recognized by Nangpal and Reuter (1990) for indirect heating methods:

$$C(t) = 1{,}084.10^{17} \cdot e^{-125950/R \cdot T} \cdot t \qquad (3)$$

In this relationship, C(t) is the concentration of lactulose (mg/l) obtained after heating at a constant temperature T (K) for a time t (s). R is the perfect gas constant (R=8.32 J/mol.K).

Figure 2:
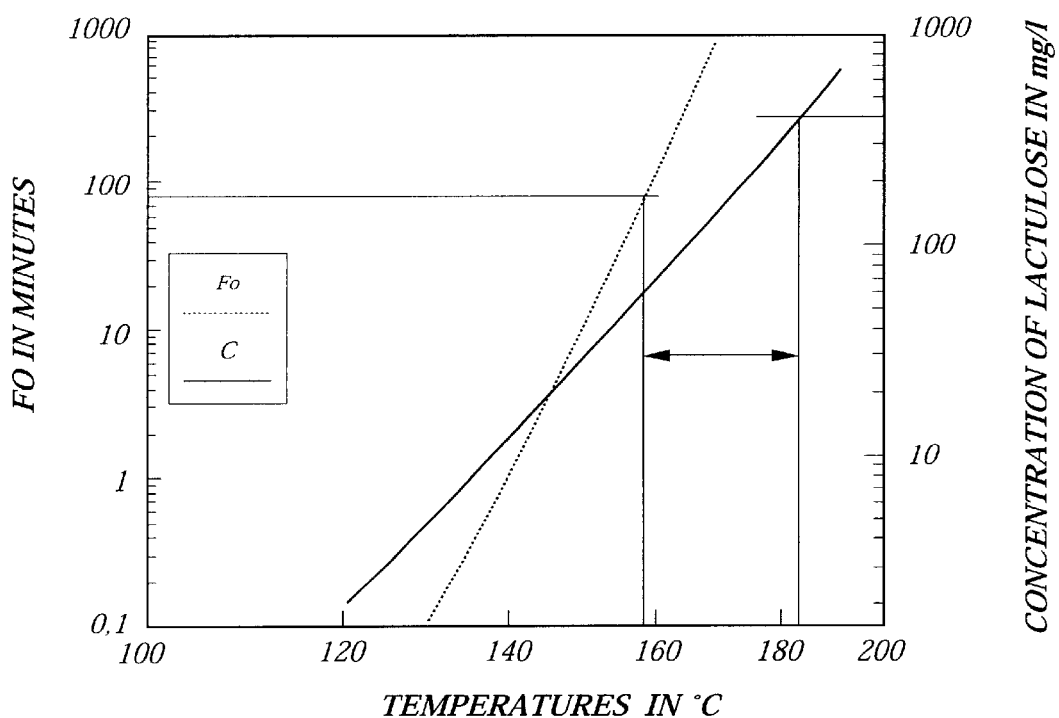
FIG. 2 is a diagram showing in what way the highest temperature of the product to be treated is determined as a function of the dwell time in the high temperature exchanger, of the sterilization scale F0 and of the quantity of lactulose C produced in the treated milk.
Figure 3:
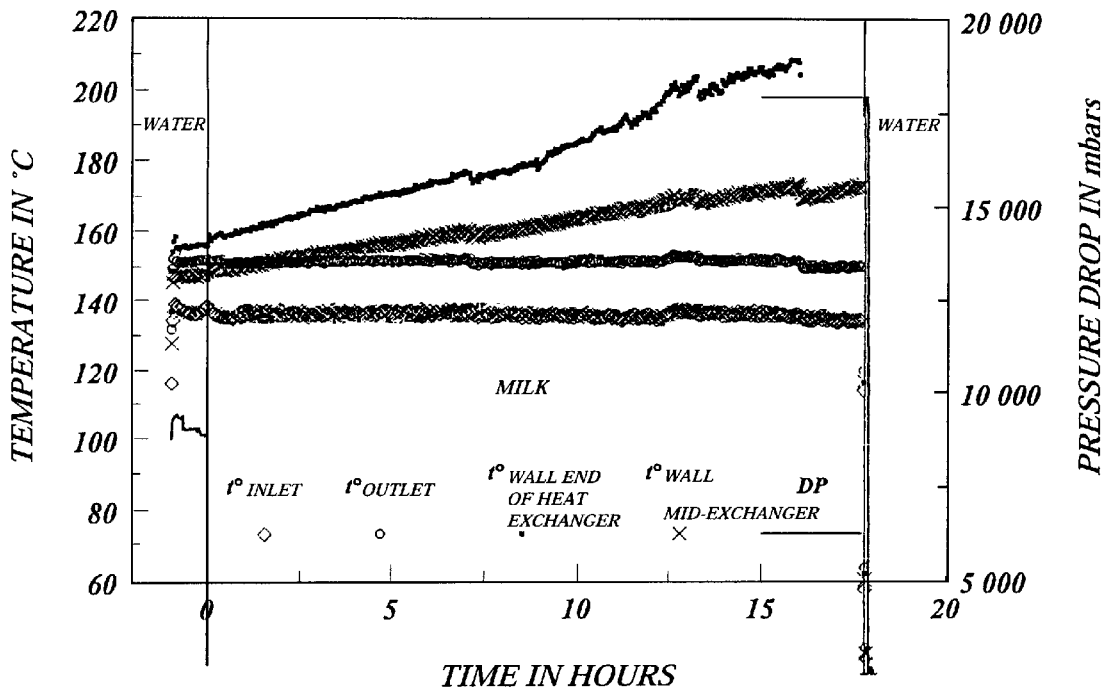
FIG. 3 shows the development of the different parameters of the high temperature exchanger as a function of the time of operation of the sterilization process.

It is emphasized at this point that the two first cited criteria (high degree of sterilization and low lactulose content) are necessarily antagonistic, as shown clearly in FIG. 2 in which there is given, for a dwell time of 1 second, the development of C and $F_0$ with temperature: to obtain a high degree of sterilization results in a high production of lactulose. Thus, in the example shown in FIG. 2, it can be seen that:

$F0 \geq 80$ min→$\theta \geq 158°$ C.

$C \leq 400$ mg/l→$\theta 182°$ C.

The permitted temperature range is thus, for this example: $158 \leq \theta \leq 182°$ C., to be able to satisfy these two criteria.

In addition to these constraints connected to the degree of sterilization and the quantity of lactulose, it is desired that the time of continuous operation of the sterilization process be at least 16 hours, without interruption and hence without an intermediate cleaning sequence. This implies that the fouling of the different heat exchange surfaces, often inevitable during milk sterilization, be low on the one hand and well controlled on the other hand, so as not to lead to pressures in the installation that are too high.

Finally, it follows that the quality of the milk must be at least equivalent to that of conventionally sterilized milk (UHT); the criteria of quality are for example the color, the taste and could also include the vitamin content, the loss of aromatics, etc . . .

According to the present process of high temperature sterilization by indirect heating, the liquid to be treated is caused to circulate in a Joule effect tubular exchanger by causing to circulate in the tubular walls of this exchange an electrical current whose intensity is adjusted as a function of the outlet temperature of the product to be treated, which temperature is determined as a function of the characteristics of sterilization it is desired to obtain, which in the case of milk are $F_0$ and C as indicated above.

Moreover, according to the present process, the liquid to be treated is caused to circulate in this Joule effect tubular exchanger at a speed higher than 5 m/s, preferably a speed of 6 m/s. This high speed of flow gives rise to a self-cleaning of the Joule effect exchanger tube by stripping away or evacuation of all the organic detritus having a tendency to accumulate on the hot wall of the tube.

This speed of 5 m/s is much higher than the normal speed of flow of a liquid in a heat exchanger and it can be shown by tests that for the usual lower speeds, the self-cleaning effect does not exist, resulting in the rapid fouling of the heat exchanger if the temperature of the tubular wall is greater than 130–135° C.

The dwell time of the liquid to be treated in the Joule effect exchanger is adjusted to the desired value to obtain the desired values $F_0$ and C, by modification of the length of the tube of this Joule effect tubular exchanger.

The essential characteristics of the sterilization process according to the invention are thus:

a. the use of a tubular exchanger for indirect heating of the product to be treated, and b. circulation of the product to be treated in this tubular exchanger at a speed greater than 5 m/s to obtain a self-cleaning effect of the tubular exchanger.

To practice the present invention, the diameter of the tubular exchange tube must be determined as a function of the speed greater than 5 m/s that it is desired to obtain and of the flow rate of the product to be treated, which is computed according to the following formula:

$$V = \frac{4Q}{\pi D^2}$$

in which Q is the flow rate of liquid to be treated
D is the diameter of the tube
V is the speed of flow of the liquid.

As indicated above, the length of the exchange tube is calculated as a function of the dwell time calculated from the sterilization characteristics $F_0$ and C in the case of milk, and the speed of circulation of the product, by the formula:

Dwell time=l/V in which: l is the tube length
V the speed of flow of the liquid.

The good results obtained with this sterilization process have been able to be verified in a pilot installation whose diagram is indicated in FIG. 1.

This installation comprises, supplied from a vat of 5000 liters, a starting vat and a centrifugal pump schematically shown at 1, a flow meter A, a preheating exchanger B, a homogenizer D, a recuperative heat exchanger for increasing temperature E and decreasing temperature F, a preheating at G of the milk to a temperature of 135° C., a Joule effect sterilizer I delivering at its outlet milk at 152° C., a room temperature cooler J and coolers K and M whose outlet comprises a counterpressure vane, a device for taking samples and for returning to storage 2.

The Joule effect sterilizer I has been dimensioned such that the speed of flow of the milk will be greater than 5 m/s. The outlet temperature of the product, 152° C., and the time of passage through the sterilizer, have been selected such that the values of $F_0$ will be of the order of 80 minutes and C slightly greater than 400 mg/l. Only this portion of the pilot installation is new, the other elements of the latter being used at present for the treatment of milk.

The Actijoule® sterilizer is of course the portion of the process in which the milk passes from 135 to 152° C., which is the most critical as to the fouling phenomenon. On the Actijoule® apparatus, two measurement means being available to follow the possible fouling: the pressure drop at the terminals of the apparatus (conventional process) and the wall temperature; this latter measurement is a bit more specific to the Actijoule® apparatus, because of its operation: the outlet temperature of the product is adjusted by modulating an electric power, a current of the order of 800 A traversing directly the wall of the tube; the passage of this current creates by the Joule effect a heating of the wall and thus the heating of the fluid within the tube. Thus, when a deposit forms on the wall, the thermal resistance increases and as a result, to obtain constant fluid temperature, the temperature of the wall increases.

If the temperature of the wall increases in the course of a test because of the formation of a deposit on this wall, that is not to say that the temperature of the fluid increases and reaches this wall temperature.

Let is be supposed that at the outset (a clean exchanger), the temperature of the fluid will be 150° C. for a wall temperature of 155° C. (temperatures at the end of the apparatus). After a time t, the exchanger being fouled, the temperature of the wall rises to 170° C.; the radial temperature distribution is thus that indicated in FIG. 5. The liquid portion of the fluid always has a temperature comprised between 152 and 155° C., the 15° C. (between 155 and 170° C.) being "absorbed" in the thickness of the deposit.

Figure 4:
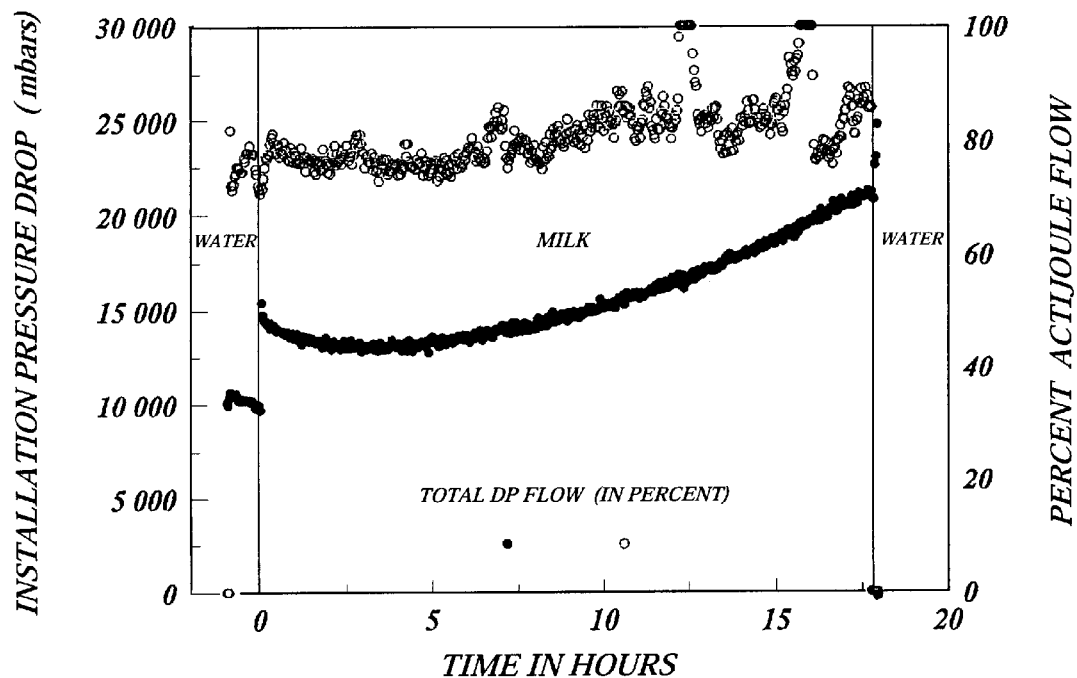
FIG. 4 shows the total pressure drop of the pilot installation and the heating power in percent of the high temperature exchanger as a function of the operating time of the sterilization process.
Figure 5:
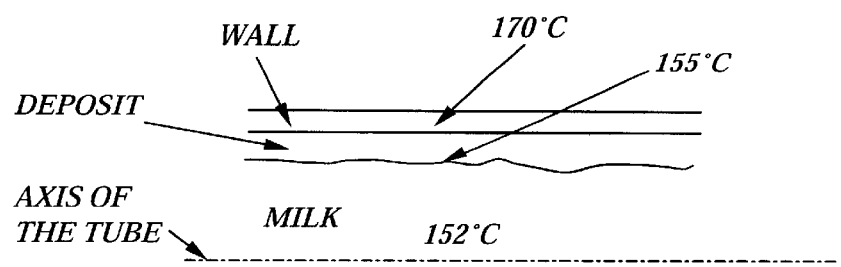
FIG. 5 is a diagram of the temperature gradient about the tube of the tubular exchanger.

FIGS. 4 and 5 show that essentially the Actijoule® exchanger is fouled over the course of the 18 hours that the test has lasted; the pressure drop increases from 12 to 18 bars (a factor of 1.5) and the wall temperature at the end of the exchange increases at a regular rate of 2.5° C./h. The increases remain in all cases tolerable and permit effectively operation for 18 hours without interruption and hence without an intermediate cleaning sequence.

It will also be noted in FIGS. 4 and 5 that, even if the conditions of operation develop (fouling, progressive decrease of flow rate, . . . ) the temperature regulation is excellent. The several abrupt temperature increases and decreases shown in these figures correspond solely to deliberate changes in the standard for temperature regulation.

Finally, to give an order of size to the thickness of the layer of deposit at the end of the test, the measurement of pressure drop shows that this thickness has not exceeded 2 to 3/10ths of a millimeter. This was confirmed once the test was completed, during disassembly and visual inspection of the Actijoule® tubes.

FIG. 4 shows on the one hand the overall increase in pressure drop for any installation, and on the other hand the very low increase of electrical power consumed in the course of 18 hours of the test.

During disassembly and visual inspection of the Joule effect exchanger tubes, it was noted that the deposit was formed exclusively or nearly so, of mineral crystal, to the exclusion of all organic material. This result was not surprising for elevated temperature treatment and can result only from the high speed of flow of the product to be treated. The fact that the deposit is mineral is also an advantage because that facilities cleaning the tubes.

Of course microbiological analyses and measurements of the quantity of lactulose have been carried out throughout the time of testing.

Microbiological analyses have shown that all the milk specimens removed were all found to be sterile even though before treatment they were deliberately seeded with highly resistant spores.

The mean lactulose content of the tested specimens is 438 mg/l.

Color analyses of the treated milk indicate a mean color index of 1.6, which corresponds to a milk of excellent quality, given that a milk would appear significantly yellow for a value of 8 and that for UHT milk a value of 5 is frequent.

Figure 6:
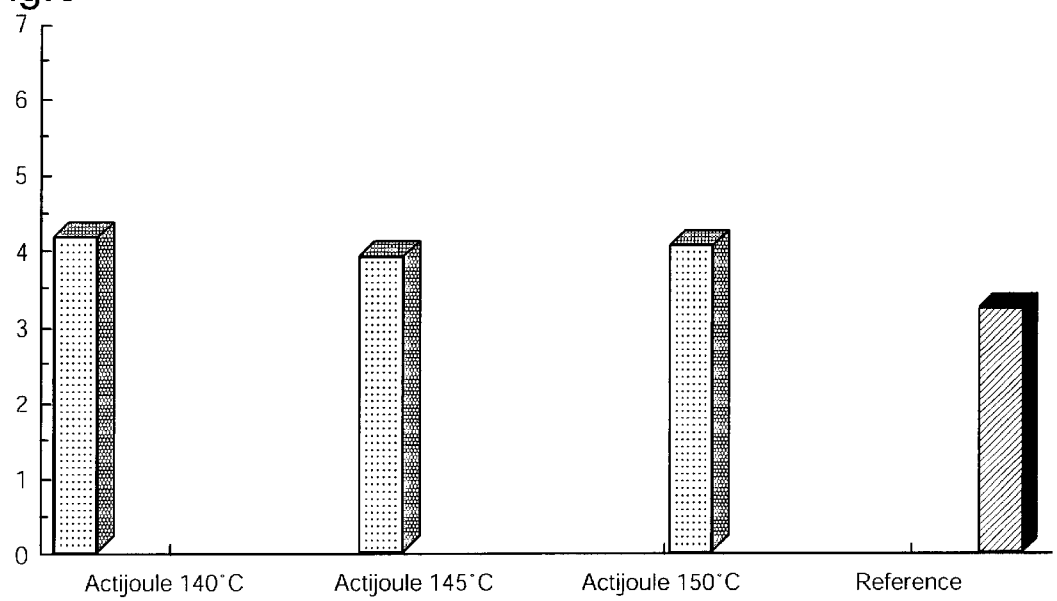
FIGS. 6 and 7 show the evaluation of the odor, respectively of the odor of a milk treated according to the present process at different maximum temperatures, and of a milk treated by a conventional reference process.
Figure 7:
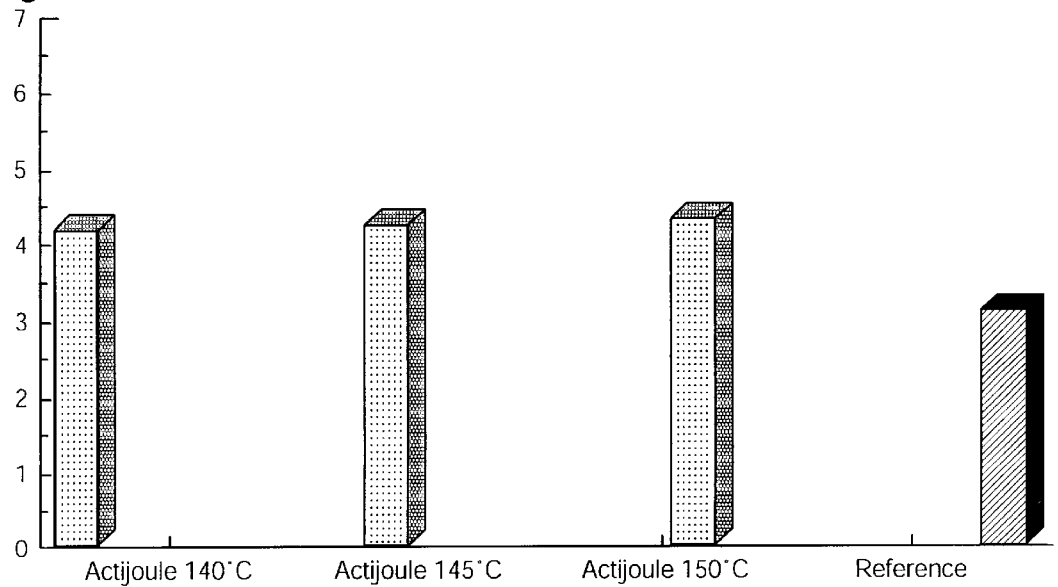

FIGS. 6 and 7 show that the sensory evaluation of milk treated according to the process is better as to its odor and its aroma than a reference UHT milk.

Index 1 of these figures indicates a milk of very markedly cooked character and index 7 a very markedly fresh character.

Feasibility tests have been carried out on raw milk which is a product particularly sensitive to thermal treatments, and the results show that with the present process, a perfect sterilization can be obtained, even in the presence of highly resistant spores, whilst improving particularly the quality of the treated product relative to products obtained by known treatment processes.

The test of the process has been carried out solely on the treatment at high temperature of milk, because it is the most critical part of the treatment both as to qualities of the treated product and as to fouling of the installation. It is evident that all of the thermal treatment, including preheating, can be carried out with tubular exchangers and according to the present process.

It is also evident that the present process can be used to treat thermally and to sterilize other food, cosmetic or pharmaceutical products, for example.

The process was tested with a Joule effect exchanger, but it follows that indirect heating of the product can be obtained by a tubular exchanger having another heat source, for example a heat exchange fluid.

What is claimed is:

1. Process for sterilizing a liquid or pasty product by indirect heating, which comprises: circulating the product to be treated in a tubular exchanger with a speed greater than 5 m/s, wherein the heat is generated by flowing an electric current through a wall of the tubular exchanger.

2. The process according to claim 1, wherein electrical power delivered to the tube of the tubular exchanger is adjusted as a function of the temperature of the product to be treated at an outlet of the tubular exchanger.

3. The process according to claim 2, wherein the product to be treated is raw milk, and the electrical power delivered is adjusted such that the temperature of the milk at the outlet of the tubular exchanger will be greater than 150° C.

4. The process according to claim 2, wherein the length of the tube of the tubular exchanger is determined as a function of the desired duration of treatment.

5. The process according to claim 3, wherein the length of the tube of the tubular exchanger is determined as a function of the desired duration of treatment.

6. The process according to claim 1, wherein the process is carried out for a duration of at least 16 hours without interruption.

7. Process for sterilizing a liquid or pasty product by indirect heating, which comprises: circulating the product to be treated in a tubular heat exchanger with a speed greater than 5 m/s.

8. The process according to claim 7, wherein the temperature increase of the product to be treated is obtained by flowing an electric current through a wall of the tubular heat exchanger.

9. The process according to claim 8, wherein the electrical power delivered to the tube of the tubular heat exchanger is adjusted as a function of the temperature of the product to be treated at an outlet of the tubular heat exchanger.

10. The process according to claim 9, wherein the product to be treated is raw milk, and the electrical power delivered is adjusted such that the temperature of the milk at the outlet of the tubular heat exchanger will be greater than 150° C.

11. The process according to claim 10, wherein the length of the tube of the tubular heat exchanger is determined as a function of the desired duration of treatment.

12. The process according to claim 9, wherein the length of the tube of the tubular heat exchanger is determined as a function of the desired duration of treatment.

13. The process according to claim 7, wherein the process is carried out for a duration of at least 16 hours without interruption.

* * * * *